United States Patent [19]

Capitant et al.

[11] Patent Number: 5,260,787
[45] Date of Patent: Nov. 9, 1993

[54] FILM-TO-VIDEO FRAME IMAGE CONVERSION APPARATUS AND METHOD FOR SELECTIVELY IDENTIFYING VIDEO FIELDS AND FRAMES

[75] Inventors: Patrice J. Capitant, Los Altos; Vinson R. Perry, San Carlos; David O. Hodgson, San Mateo, all of Calif.

[73] Assignee: Sony Electronics Inc., Park Ridge, N.J.

[21] Appl. No.: 883,888

[22] Filed: May 12, 1992

Related U.S. Application Data

[63] Continuation of Ser. No. 699,928, May 14, 1991, abandoned.

[51] Int. Cl.⁵ .................. H04N 7/01; H04N 3/36; H04N 5/753
[52] U.S. Cl. .................. 358/140; 358/214; 358/54; 358/11
[58] Field of Search .......... 358/54, 214, 141, 140, 358/142, 215, 216, 147, 146, 11, 346

[56] References Cited

U.S. PATENT DOCUMENTS

| | | | |
|---|---|---|---|
| 4,205,337 | 5/1980 | Millward | 358/54 |
| 4,338,634 | 7/1982 | Dillon et al. | 358/214 |
| 4,524,392 | 6/1985 | Poetsch | 358/214 |
| 4,641,188 | 2/1987 | Dischert | 358/140 |
| 4,786,979 | 11/1988 | Claus et al. | 358/335 |
| 4,876,596 | 10/1989 | Faroudja | 358/140 |
| 4,881,125 | 11/1989 | Krause | 358/141 |
| 5,016,101 | 5/1991 | Richards et al. | 358/140 |

Primary Examiner—James J. Groody
Assistant Examiner—Safet Metjahic
Attorney, Agent, or Firm—Limbach & Limbach

[57] ABSTRACT

A film-to-video frame image convertor includes a 3-2 pulldown frame convertor for converting signals representing input film frame images, having a lower associated film frame image rate, to signals representing output video frame images having a higher associated video frame image rate. The output video frame images consist of genuine and simulated video frame images, which correspond to actual input film frame images and multiple input film frame images, respectively, in accordance with a 3-2 film-to-video frame pulldown. Each genuine video frame image consists of two video field images corresponding to two actual film field images from the same film frame image. Each simulated video frame image consists of two video field images corresponding to two actual film field images from different film frame images, with one of the two video field images being a duplicate of a video field image in an adjacent video frame image. Identification signals are selectively inserted into the vertical blanking interval of some of the output video frame images to identify which ones are simulated video frame images containing duplicate video field images. This allows the duplicate video field images to be identified and selectively deleted when the video frame images, having the higher associated video frame image rate, are to be reconverted to film frame images having the lower associated film frame image rate.

26 Claims, 5 Drawing Sheets

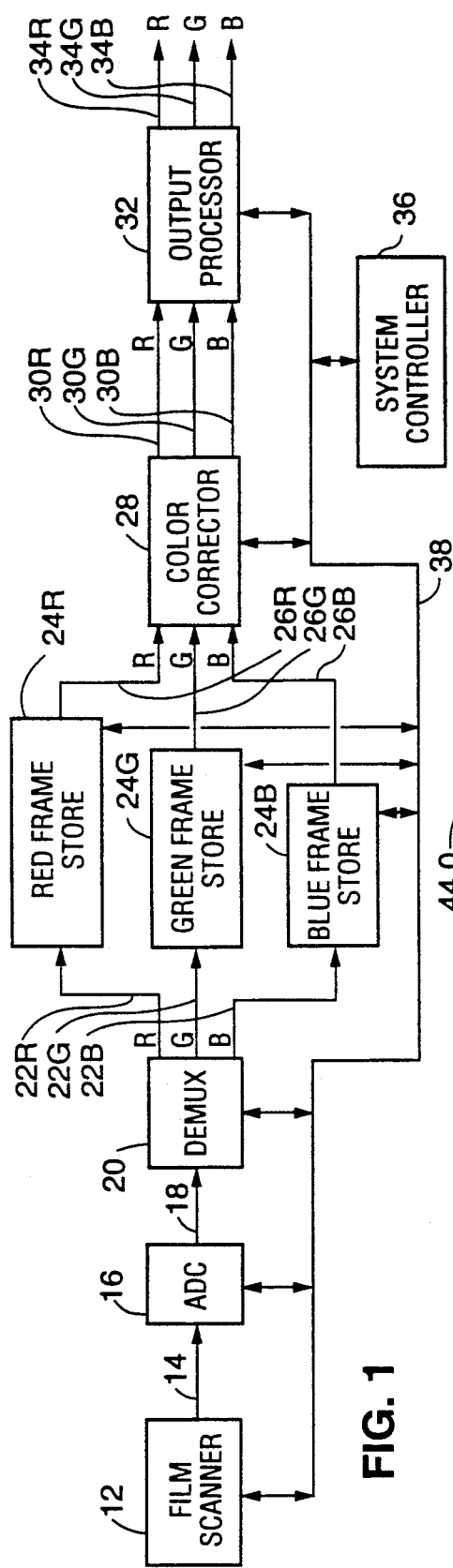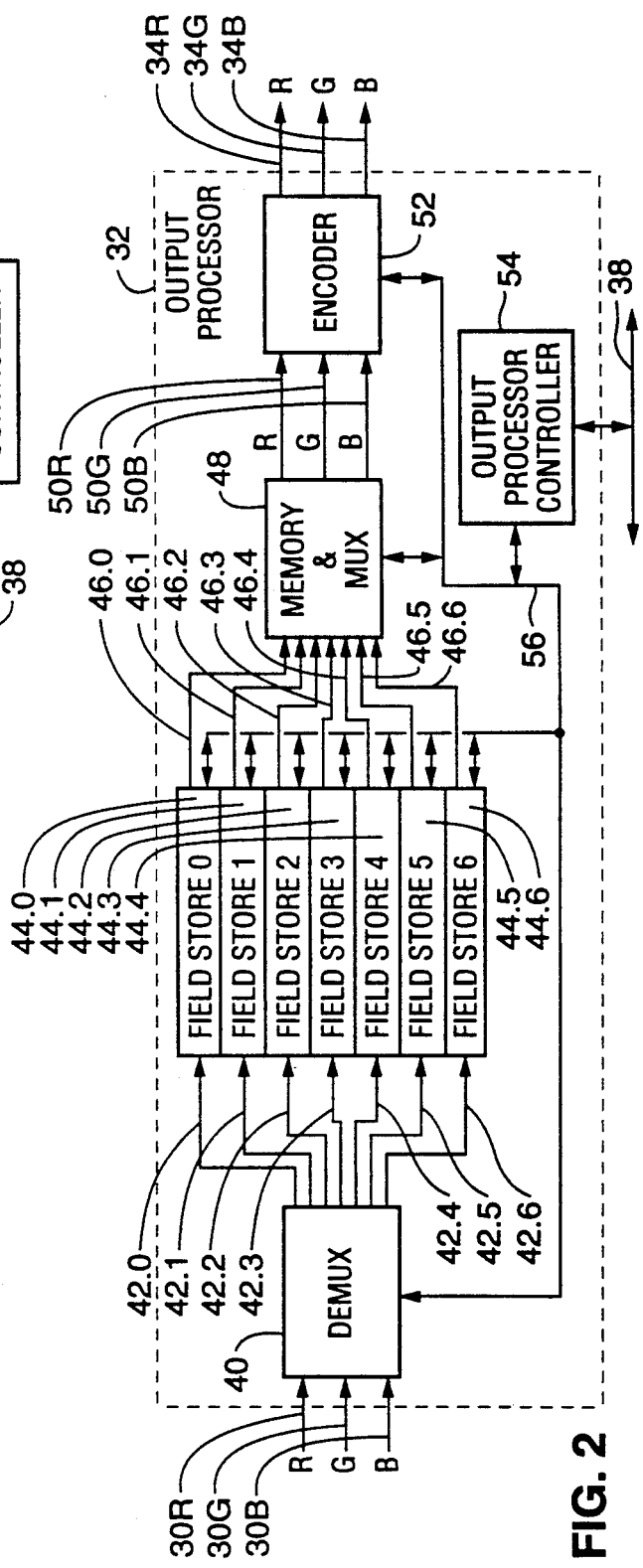
FIG. 1
FIG. 2

FILM-TO-VIDEO FRAME IMAGE CONVERSION APPARATUS AND METHOD FOR SELECTIVELY IDENTIFYING VIDEO FIELDS AND FRAMES

This is a continuation of co-pending application Ser. No. 07/699,928, filed on May 14, 1991, now abandoned.

BACKGROUND OF THE INVENTION

1. Field of the Invention

The present invention relates to film scanning systems, and in particular, to frame converters for converting film frame images to video frame image signals.

2. Description of the Related Art

Conventional motion picture film consists of frame images which are commonly displayed sequentially at a rate of 24 frames per second ("fps"), 30 fps or some other rate, as desired. To convert motion picture film images into video image signals, film scanning systems, such as "telecines," have been developed. These systems generate video image signals from motion picture film images by scanning the film frames sequentially to generate film frame image signals. These film frame image signals are then converted into video frame image signals having a standard video frame rate. The standard video frame rate is 25 video frames per second for PAL video, 29.97 video frames per second for NTSC or 30 video frames per second for SMPTE-240M high definition video.

Conventional telecines operate in "real time" in the sense that they generate video frame image signals from motion picture film frame images at the desired standard video frame rate (such as the standard PAL or NTSC video frame rate). The frame rate mismatch between film (24 fps) and PAL video (25 fps) presents virtually no problem. A conventional PAL telecine often scans the motion picture film at the elevated rate of 25 film frames per second for the sake of processing convenience, with little or no problem for the viewers.

However, the frame rate mismatch between the conventional film rate (24 fps) and the NTSC (29.97 fps) or SMPTE-240M high definition video frame rate (30 fps) is significant. Therefore, a technique commonly referred to as "3-2 pulldown" (or "3-2-3-2 pulldown") is often used to generate these higher video frame rates using a telecine. As discussed more fully below, film-to-video frame image conversion using the 3-2 pulldown technique produces actual, or genuine, video frame images (containing original video field images) and simulated video frame images (containing video field images which are duplicates of other original video field images). In other words, simulated video frame images are generated which use duplicate video field images which are, in turn, based upon original film field images. These simulated video frame images are combined with genuine video frame images, thereby producing a video signal which can be displayed, recorded or otherwise processed as desired.

However, if it is desired to convert this video signal back to film, the video-film frame rate mismatch makes it all but impossible. The duplicate video field images within the simulated video frame images produced via the 3-2 pulldown are literally interlaced with the original video field images within the genuine video frame images (which directly represent genuine film frame images), due to the interlaced scanning characteristic of video. Therefore, these simulated video frame images cannot simply be deleted.

Thus, it would be desirable to have a means for identifying the simulated video frame images and duplicate video field images so as to facilitate their removal when converting the video images back to film images.

SUMMARY OF THE INVENTION

The present invention comprises means for converting film frame images having a lower associated film frame image rate to video frame images having a higher associated video frame image rate.

Film frame images are converted to video frame images in accordance with a 3-2 film-to-video frame pulldown, producing "genuine" and "simulated" video frame images. Each genuine video frame image comprises two video field images corresponding to two actual film field images from the same film frame image. Each simulated video frame image comprises two video field images corresponding to two actual film field images from different film frame images, with one of the two video field images being a duplicate of a video field image in an adjacent video frame image.

In accordance with the present invention, identification signals are selectively inserted, or encoded, into some of the output video field images to identify those which are duplicate video field images. Alternatively, identification signals are selectively inserted, or encoded, into some of the output video frame images to identify those which are simulated video frame images containing duplicate video field images. These identification signals, or "marker" signals, allow the duplicate video field images or simulated video frame images to be identified and selectively processed, e.g. deleted, when the video frame images, having a higher associated video frame image rate, are to be converted back to film frame images having a lower associated film frame image rate.

These and other objectives, features and advantages of the present invention will be understood upon consideration of the following detailed description of the invention and the accompanying drawings.

BRIEF DESCRIPTION OF THE DRAWINGS

Throughout the figures, similar numerals are used to indicate similar elements.

FIG. 1 illustrates a block diagram of a digital film scanning system using an image converter in accordance with the present invention.

FIG. 2 illustrates a more detailed block diagram of the output processor of FIG. 1.

DETAILED DESCRIPTION OF THE INVENTION

Figure 3:
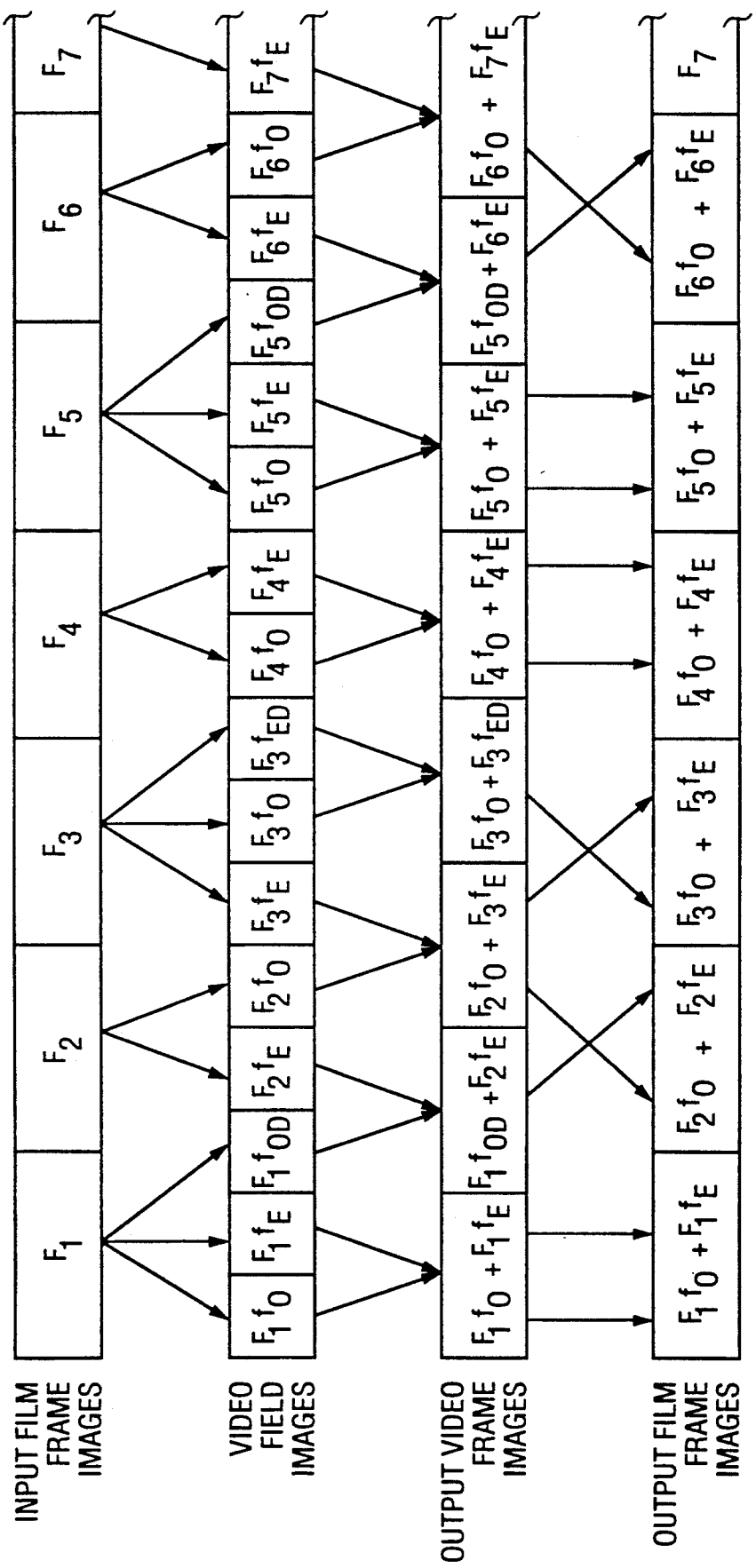
FIG. 3 illustrates the concept of 3-2 film-to-video frame pulldown.

The present invention can be embodied within the apparatus disclosed in a commonly assigned, copending patent application having Ser. No. 07/741,329, entitled "Non-Real-Time Film Scanning System" and filed by P. Capitant et al. on Aug. 7, 1991, the specification of which is incorporated herein by reference.

Referring to FIG. 1, a digital film scanning system 10 providing film-to-video frame image conversion with video field and frame identification in accordance with the present invention consists of the functional elements illustrated and connected as shown. The film scanner 12, many types of which are well known in the art, scans the film (not shown) and produces an analog film frame image signal 14. This film frame image signal 14 is a series of sequential film frame image signals representing red, green and blue film frame images. This signal 14 is then digitized by an analog-to-digital converter 16 to produce a digital film frame image signal 18 which, in turn, consists of the sequential red, green and blue film frame image signals.

It should be understood that the red, green and blue film frame image signals discussed herein need not be received or processed in any specific sequence. Further, red, green and blue color image signals are exemplary; other forms of color image signals (e.g. cyan, magenta and yellow) can be substituted therefor.

The digital film frame image signal 18 is demultiplexed by a demultiplexor 20 to separate the red 22R, green 22G and blue 22B film frame image signals. These red 22R, green 22G and blue 22B film frame image signals are then stored in corresponding frame stores (e.g. memories) 24R, 24G, 24B.

The separate red 26R, green 26G and blue 26B film frame image signals are outputted simultaneously in parallel from their respective frame stores 24R, 24G, 24B to a color corrector 28. The color corrector 28 processes these signals 26R, 26G, 26B to selectively produce color-corrected red 30R, green 30G and blue 30B film frame image signals. One such color corrector 28 is disclosed in a commonly assigned, copending patent application having Ser. No. 07/710,704, entitled "Digital Color Correction System and Method" and filed by P. Capitant et al. on Jun. 5, 1991, the specification of which is incorporated herein by reference.

The color-corrected film frame image signals 30R, 30G, 30B are processed by an output processor 32 to produce corresponding red 34R, green 34G and blue 34B video frame image signals. As discussed more fully below, the output processor 32 converts the film frame image signals 30R, 30G, 30B to video frame image signals 34R, 34G, 34B via a 3-2 film-to-video frame pulldown and selectively identifies duplicate video field images or simulated video frame images to facilitate subsequent processing thereof.

The film scanning system 10 is controlled through an interface network 38 by a system controller 36. The system controller 36 selectively controls and synchronizes the generation, processing and "identifying" of the various forms of film and video frame image signals, as discussed above. For example, whereas the demultiplexed red 22R, green 22G and blue 22B film frame image signals were received serially in time by the frame stores 24R, 24G, 24B, due to their sequential nature within the digital film frame image signal 18 (as discussed above), the system controller 36 controls the outputting of their stored equivalents 26R, 26G, 26B to parallely align them in time.

Referring to FIG. 2, the output processor 32 of FIG. 1 and discussed above consists of the functional elements illustrated and connected as shown. The color-corrected film frame image signals 30R, 30G, 30B are received by a demultiplexor 40 which demultiplexes, e.g. "de-interlaces," their respective video field image signals. These video field image signals 42.0–42.6 are selectively outputted to the field stores 44.0–44.6. As discussed more fully below, the video field image signals 42.0–42.6 are selectively stored within the field stores 44.0–44.6 in accordance with the 3-2 film-to-video frame pulldown.

The video field image signals 46.0–46.6 subsequently outputted from the field stores 44.0–44.6 are temporarily stored and then multiplexed in a memory and multiplexor unit 48. This multiplexing produces video frame image signals 50R, 50G, 50B which are then provided with appropriate blanking and synchronization pulses (e.g. for NTSC or SMPTE-240M) by an encoder 52 to produce red 34R, green 34G and blue 34 video frame image signals suitable for displaying or recording. As discussed further below, the encoder 52 provides the selective identification of video fields or frames within the red 34R, green 34G and blue 34B video frame image signals.

It should be understood that the video field image signals 42.0–42.6, 46.0–46.6 shown inputted to and outputted from the field stores 44.0–44.6 each represent their respective red, green and blue field image signal counterparts. In other words, each field store inputs and subsequently outputs three field image signals, i.e. corresponding red, green and blue field image signals, which together represent a full color video field image, or one half of a video frame image. The foregoing functions of the output processor are controlled by an output processor controller via an interface network 56. This output processor controller 54, in turn, receives its instructions via the system interface network 38, as discussed above.

Referring to FIG. 3, the 3-2 film-to-video frame pulldown operation performed by the output processor 32 can be understood. The following discussion describes the 3-2 film-to-video frame pulldown operation performed upon the inputted red 30R, green 30G and blue 30B film frame image signals to produce the outputted red 34R, green 34G and blue 34B video frame image signals.

The input film frame images $F_N$ are demultiplexed into their constituent odd $f_O$ and even $f_E$ fields. Some duplicate odd $f_{OD}$ and even $f_{ED}$ fields are generated to perform the 3-2 film-to-video frame pulldown. These video field images are then combined to produce the output video frame images, each of which contains one odd $f_O$ and one even $f_E$ field image. For example, the first input film frame image $F_1$ is demultiplexed into its constituent field images $F_1f_O$, $F_1f_E$. Further, its odd video field image $F_1f_O$ is duplicated. Its odd $F_1f_O$ and even $F_1f_E$ field images are combined to produce the first output video frame image ($F_1f_O + F_1f_E$). Its duplicate odd video field image $F_1f_{OD}$ is combined with the even video field image $F_2f_E$ of the second input film frame image $F_2$ to produce the second output video frame image ($F_1f_{OD} + F_2f_E$). This video field image duplication and interlacing with adjacent video field images continues as shown in FIG. 3.

In accordance with the present invention, when the output video frame images are converted back to film frame images, the appropriate odd $f_O$ and even $f_E$ video field images are combined to produce the output film frame images. For example, the first output video frame image is used as-is to produce the first output film frame image. However, the second and third output video frame images must be separated into their constituent video field images and recombined appropriately to produce the second output film frame image, as shown. The field and frame identification of the present invention facilitates this recombining of appropriate output video field images to convert back to film frame images, as discussed more fully below.

Figure 4:
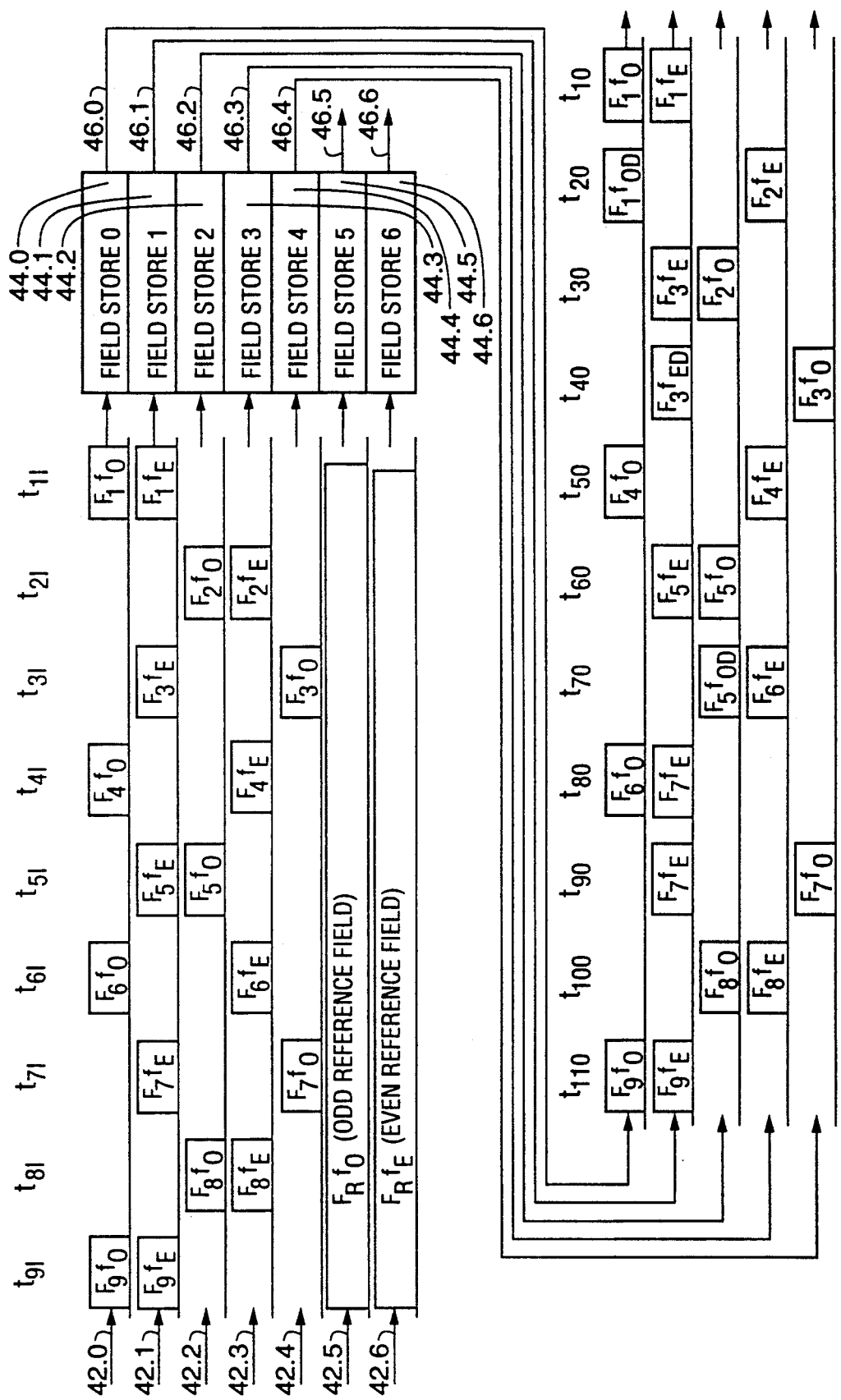
FIG. 4 illustrates video field image signal flow through the output processor of FIG. 2.

Referring to FIG. 4, the input and output sequencing of the input 42.0–42.6 and output 46.0–46.6 video field image signals, respectively, of the field stores 44.0–44.6 to produce the appropriate output video frame images shown in FIG. 3 and discussed above can be better understood. The first five field stores 44.0–44.4 are used to perform the 3-2 film-to-video frame pulldown. The remaining two field stores 44.5, 44.6 are used for storing reference field images $F_Rf_O$, $F_Rf_E$ for a reference frame image $F_R$. The reference frame image $F_R$ can be any video frame image selectively designated for use as a "reference," e.g. for comparisons of color parameters, etc.

During the first input timing cycle $t_{1I}$, the first input film frame image $F_1$ (i.e. both fields $F_1f_O$, $F_1f_E$) is loaded into field stores "0" (44.0) and "1" (44.1). During the next input timing cycle $t_{2I}$, the second input film frame image $F_2$ (with both of its fields $F_2f_O$, $F_2f_E$) is loaded into field stores "2" (44.2) and "3" (44.3). During subsequent input timing cycles $t_{NI}$ (e.g. $t_{3I}$–$t_{9I}$), further input film frame images $F_N$ (e.g. $F_3$–$F_9$) are loaded as shown.

During the first output timing cycle $t_{1O}$, both field images $F_1f_O$, $F_1f_E$ corresponding to the first input film frame image $F_1$ are outputted. During the second output timing cycle $t_{2O}$, the odd field image from the first input film frame image is outputted again as a duplicate field image $F_1f_{OD}$, along with the even field image $F_2f_E$ corresponding to the second input film frame image $F_2$. During subsequent output timing cycles $t_{NO}$ (e.g. $t_{3O}$–$t_{11O}$), subsequent field images are outputted in pairs as shown. This results in an output pairing of video field images in accordance with FIG. 3.

During any input timing cycle as desired, the reference field images $F_Rf_O$, $F_Rf_E$ for a reference frame image $F_R$ are loaded into field stores "5" (44.5) and "6" (44.6). Similarly, during any output timing cycle as desired, the reference field images $F_Rf_O$, $F_Rf_E$ can be outputted.

As discussed above, these output video frame image signals 46.0–46.4 are multiplexed and encoded to produce the red 34R, green 34G and blue 34B video frame image signals suitable for displaying or recording. As discussed further above, the encoder 52 selectively identifies the duplicate field images or simulated frame images to facilitate their removal if it is desired to convert the video frame images back to film frame images.

Figure 5:
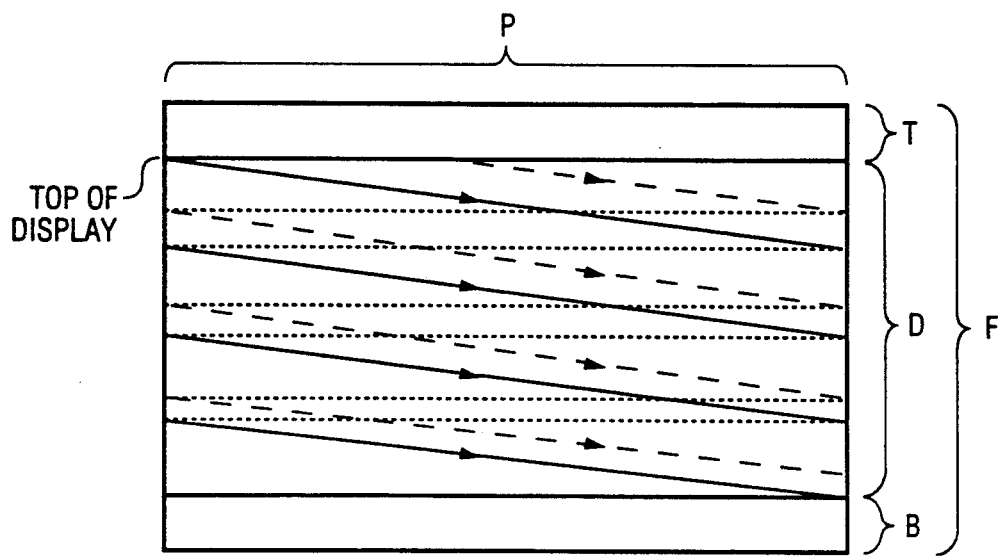
FIG. 5 illustrates a visual representation of the placement of video field and frame image identification signals in accordance with the present invention.

To achieve this identification, identification, or "marker," signals are inserted (by the encoder 52) into the video field images or video frame images. Preferably, these identification signals are inserted near the beginning of the appropriate display field or frame to allow for immediate recognition of the duplicated field or simulated frame image. For example, referring to FIG. 5, the identification signals are preferably inserted into video field or frame image lines within the top portion T of the video frame F, i.e. near the top of the video display D. This allows the duplicate video field image or simulated video frame image to be quickly recognized and processed accordingly (e.g. deleted), without having to wait for a full field or frame image to be processed.

Alternatively, the identification signals can be inserted into video field or frame image lines within the bottom portion B of the video frame F. However, such a placement of the identification signals would delay any use or processing of the identification information until all video field or frame lines within the display portion D of the video frame F had passed. Furthermore, as discussed further below, part of the top portion T of the video frame F is retained, e.g. recorded, along with the active display video by most standard video tape recorders. Thus, placing the identification signals in this top portion T would allow for their retention along with the active display video.

Figure 6:
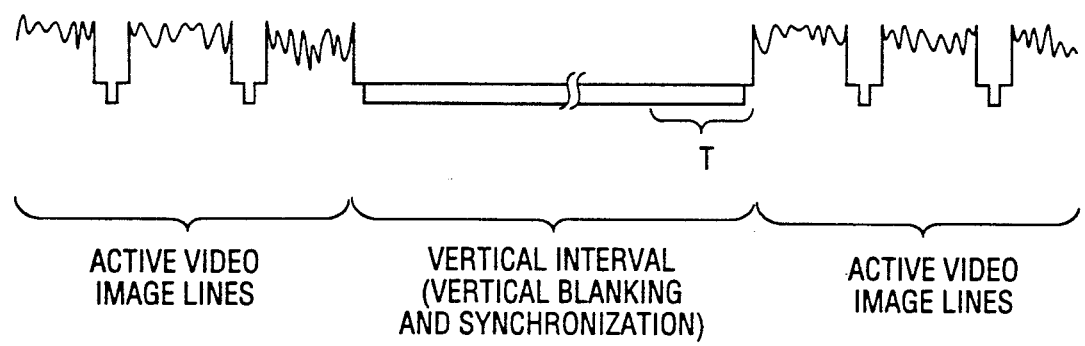
FIG. 6 illustrates an electronic signal representation of the placement of video field and frame image identification signals in accordance with the present invention.

Referring to FIG. 6, the preferred point of insertion of the identification signals can be better understood. The identification signals would preferably be inserted during the vertical interval in the area T thereof corresponding to that portion of the vertical interval near the top of the next field or frame. The identification signals can be added to the vertical interval signal in any desired format, and can be inserted in a manner similar to the insertion of horizontal or vertical blanking or synchronization signals.

The insertion, or encoding, of information can take the form of inserting "user lines" into the vertical interval T for carrying information other than, or in addition to, field or frame identification information. For example, other video processing information, such as color correction or matching information, can be inserted for use in modifying previously processed images or for use in matching scenes. Such an application is disclosed in the above-identified commonly assigned, copending patent application having Ser. No. 07/710,704, entitled "Digital Color Correction System and Method," the specification of which is incorporated herein by reference.

Figure 7:
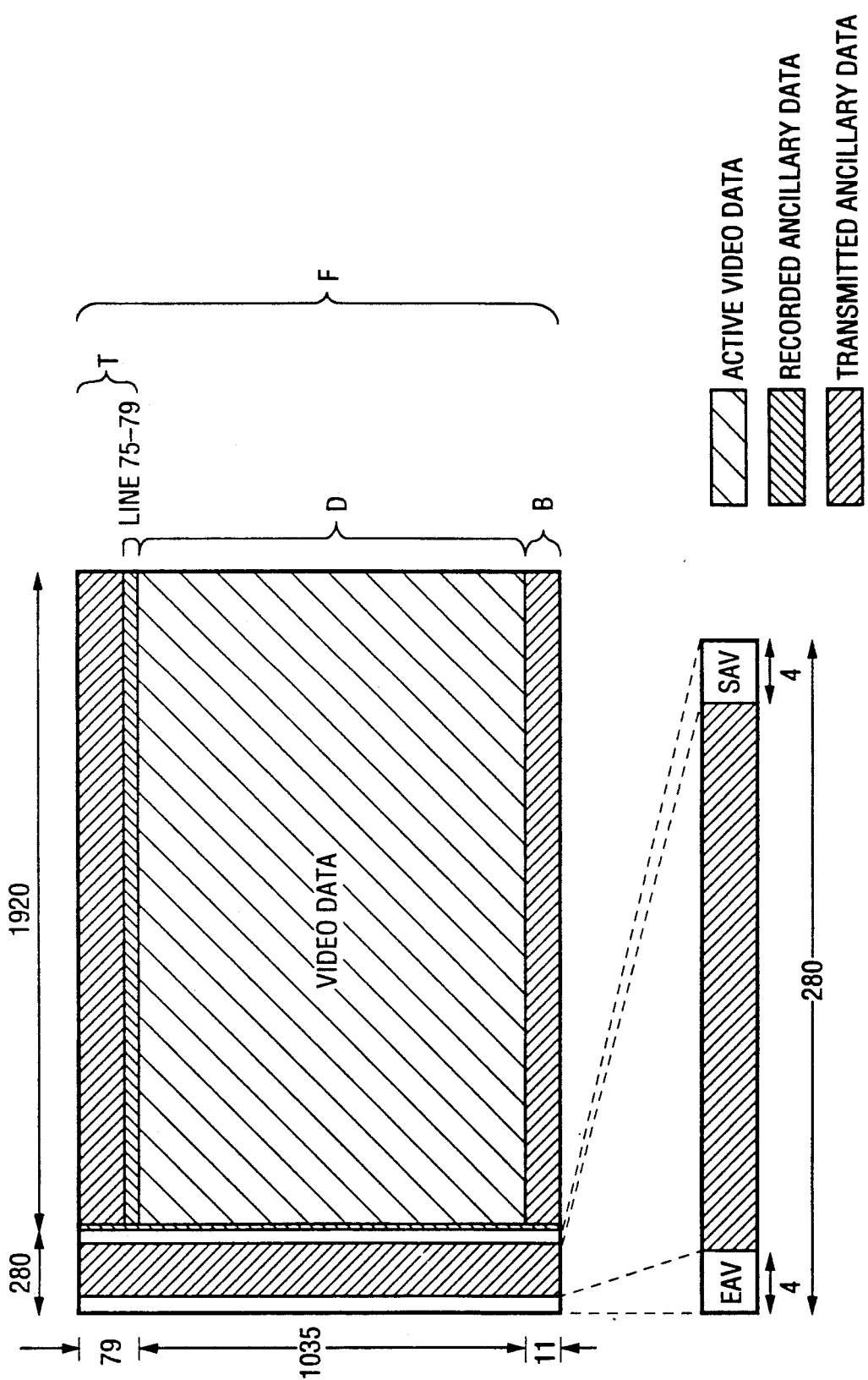
FIG. 7 illustrates an exemplary SMPTE 240M digital video standard which can be used with an image converter in accordance with the present invention.

Referring to FIG. 7, an exemplary SMPTE 240M digital video standard is illustrated which can be used for the inserting, or encoding, of the identification signals. Active video data within the display portion D occupies 1035 lines (e.g. lines 80–1114) with 1920 pixels each (e.g. pixels 281–2200) in an SMPTE 240M video frame F. The video frame F has two interlaced video fields, with one field having 517 lines and the other field having 518 lines. The vertical interval has 90 lines of 1920 pixels each, (with some lines at the "top" T (e.g. lines 1–79) and some lines at the "bottom" B of the video frame F (e.g. lines 1115–1125). The horizontal interval has 1125 lines (e.g. lines 1–1125), with 280 pixels each (e.g. pixels 1–280), all grouped at the "left" of the video frame F.

The identification signals can be inserted into lines 75–79 in the vertical interval of the video frame. These lines are generally reserved for ancillary data which is transmitted with all other data and retained for further processing or recording, similar to the active video data (e.g. recorded with the active video data). The remainder of the lines in the vertical interval are generally only transmitted and not retained.

In a preferred embodiment of the present invention, the ancillary data is made up of digital data "words," each of which corresponds to and has as many bits as each pixel of active video data (e.g. eight or ten bits). An exemplary format for the ancillary data includes a six-word preamble and a data field as follows:

| Preamble: | MSB | | | | | | | | | LSB |
|---|---|---|---|---|---|---|---|---|---|---|
| Word 1 | 0 | 0 | 0 | 0 | 0 | 0 | 0 | 0 | 0 | 0 |
| Word 2 | 1 | 1 | 1 | 1 | 1 | 1 | 1 | 1 | 0 | 0 |
| Word 3 | 1 | 1 | 1 | 1 | 1 | 1 | 1 | 1 | 0 | 0 |
| Word 4 | $T_7$ | $T_6$ | $T_5$ | $T_4$ | $T_3$ | $T_2$ | $T_1$ | $T_0$ | 0 | 0 |
| Word 5 | 0 | $D_{11}$ | $D_{10}$ | $D_9$ | $D_8$ | $D_7$ | $D_6$ | $P_o$ | 0 | 0 |
| Word 6 | 0 | $D_5$ | $D_4$ | $D_3$ | $D_2$ | $D_1$ | $D_0$ | $P_o$ | 0 | 0 |
| Data Field: | | | | | | | | | | |
| Word N | $X_6$ | $X_5$ | $X_4$ | $X_3$ | $X_2$ | $X_1$ | $X_0$ | $P_o$ | 0 | 0 |

⟵ (8 bit systems) ⟶

⟵ (10-bit systems) ⟶ where: $\{T_i\}$ = data type
$\{D_i\}$ = data word count
$P_o$ = odd parity bit

Each line in the horizontal interval generally includes four pixels at both the start and end thereof. The first four pixels are for the "end of active video" (EAV) data field, and the last four pixels are for the "start of active video" (SAV) data field.

The EAV and SAV data are made up of data "words," each of which corresponds to and has as many bits as each pixel of active video data (e.g. eight or ten bits). The format for the EAV and SAV data is as follows:

| | MSB | | | | | | | | | LSB |
|---|---|---|---|---|---|---|---|---|---|---|
| Word 1 | 1 | 1 | 1 | 1 | 1 | 1 | 1 | 1 | 1 | 1 |
| Word 2 | 0 | 0 | 0 | 0 | 0 | 0 | 0 | 0 | 0 | 0 |
| Word 3 | 0 | 0 | 0 | 0 | 0 | 0 | 0 | 0 | 0 | 0 |
| Word 4 | 1 | F | V | H | $P_3$ | $P_2$ | $P_1$ | $P_o$ | 0 | 0 |

⟵ (8 bit systems) ⟶

⟵ (10-bit systems) ⟶

| H | F | V | $P_3$ | $P_2$ | $P_1$ | $P_o$ |
|---|---|---|---|---|---|---|
| 0 | 0 | 0 | 0 | 0 | 0 | 0 |
| 0 | 0 | 1 | 1 | 1 | 0 | 1 |
| 0 | 1 | 0 | 0 | 1 | 1 | 1 |
| 0 | 1 | 1 | 1 | 1 | 0 | 0 |
| 1 | 0 | 0 | 1 | 1 | 0 | 1 |
| 1 | 0 | 1 | 0 | 1 | 1 | 0 |
| 1 | 1 | 0 | 1 | 0 | 1 | 0 |
| 1 | 1 | 1 | 0 | 0 | 0 | 1 | where: F = 0, during video field 1
= 1, during video field 2
V = 1, during field blanking
= 0, elsewhere
H = 0, in SAV
= 1, in EAV
$\{P_i\}$ = parity In an alternative preferred embodiment of the present invention, the identification signals and the red 34R, green 34G and blue 34B video frame image signals are analog signals (e.g. converted with digital-to-analog converters within the output processor 32). The encoder 52 then inserts (e.g. sums or mixes) the analog identification signals into the analog video frame image signals 34R, 34G, 34B.

Various other modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A film-to-video field image signal convertor for converting a plurality of film field image signals having an associated film field image rate to a plurality of video field image signals having an associated video field image rate, said field image signal convertor comprising:

field image signal receiver means or receiving a first plurality of input signals representing film field images and having an associated film field image rate, and for providing a second plurality of film field image signals;

field image signal generator means coupled to said field image signal receiver means for receiving said second plurality of film field image signals, and for selectively generating a third plurality of video field image signals representing video field images and having an associated video field image rate which is unequal to said associated film field image rate, wherein said third plurality of video field image signals includes a fourth plurality of genuine video field image signals representing genuine video field images which correspond to said film field images, and further wherein said third plurality of video field image signals further includes a fifth plurality of duplicate video field image signals which represent duplicate video field images and are duplicates of selected ones of said fourth plurality of genuine video field image signals; and identifier means for identifying each of said fifth plurality of duplicate video field image signals by inserting into each thereof one of a corresponding fifth plurality of field identification data signals which indicate that each of said fifth plurality of duplicate video field image signals is a duplicate of a selected one of said fourth plurality of genuine video field image signals.

2. A field image signal convertor as recited in claim 1, wherein said field image signal receiver means comprises image signal storage means for storing said received first plurality of input signals.

3. A field image signal convertor as recited in claim 2, wherein said image signal storage means comprises a fifth plurality of memories.

4. A field image signal convertor as recited in claim 1, wherein said field image signal generator means comprises a 3-2 pulldown frame convertor.

5. A field image signal convertor as recited in claim 4, wherein said 3-2 pulldown frame convertor comprises a memory and a multiplexor.

6. A field image signal convertor as recited in claim 1, wherein said identifier means comprises an encoder programmed to insert one of said corresponding fifth plurality of field identification data signals into each of said fifth plurality of duplicate video field image signals.

7. A field image signal convertor as recited in claim 6, wherein each of said corresponding fifth plurality of field identification data signals is inserted into a vertical blanking interval within said each one of said fifth plurality of duplicate video field image signals.

8. A film-to-video frame image signal convertor for converting a plurality of film frame image signals having an associated film frame image rate to a plurality of video frame image signals having an associated video frame image rate, said frame image signal convertor comprising:

frame image signal receiver means for receiving a first plurality of input signals representing film frame images and having an associated film frame image rate, and for providing a second plurality of film frame image signals;

frame image signal generator means coupled to said frame image signal receiver means or receiving said second plurality of film frame image signals, and for selectively generating a third plurality of video frame image signals representing video frame images and having an associated video frame image rate which is unequal to said associated film frame image rate, wherein said third plurality of video frame image signals includes a fourth plurality of genuine video frame image signals representing genuine video frame images which correspond to said film frame images, and further wherein said third plurality of video frame image signals further includes a fifth plurality of simulated video frame image signals which represent simulated video frame images and include selected portions of selected ones of said fourth plurality of genuine video frame image signals; and identifier means for identifying each of said fifth plurality of simulated video frame image signals by inserting into each thereof one of a corresponding fifth plurality of frame identification data signals which indicate that each of said fifth plurality of simulated video frame image signals includes selected portions of selected ones of said fourth plurality of genuine video frame image signals.

9. A frame image signal convertor as recited in claim 8, wherein said frame image signal receiver means comprises image signal storage means for storing said received first plurality of input signals.

10. A frame image signal convertor as recited in claim 9, wherein said image signal storage means comprises a sixth plurality of memories.

11. A frame image signal convertor as recited in claim 8, wherein said frame image signal generator means comprises a 3-2 pulldown frame convertor.

12. A frame image signal convertor as recited in claim 11, wherein said 3-2 pulldown frame convertor comprises a memory and a multiplexor.

13. A frame image signal convertor as recited in claim 8, wherein said identifier means comprises an encoder programmed to insert one of said corresponding fifth plurality of frame identification data signals into each of said fifth plurality of simulated video frame image signals.

14. A frame image signal convertor as recited in claim 13, wherein each of said corresponding fifth plurality of frame identification data signals is inserted into a vertical blanking interval within said each one of said fifth plurality of simulated video frame image signals.

15. A film-to-video field image signal conversion method for converting a plurality of film field image signals having an associated film field image rate to a plurality of video field image signals having an associated video field image rate, said field image signal conversion method comprising the steps of:

receiving a first plurality of input signals representing film field images and having an associated film field image rate, and providing therefrom a second plurality of film field image signals;

receiving said second plurality of film field image signals and selectively generating therefrom a third plurality of video field image signals representing video field images and having an associated video field image rate which is unequal to said associated film field image rate, wherein said third plurality of video field image signals includes a fourth plurality of genuine video field image signals representing genuine video field images which correspond to said film field images, and further wherein said third plurality of video field image signals further includes a fifth plurality of duplicate video field image signals which represent duplicate video field images and are duplicates of selected ones of said fourth plurality of genuine video field image signals; and identifying each of said fifth plurality of duplicate video field image signals by inserting into each thereof one of a corresponding fifth plurality of field identification data signals which indicate that each of said fifth plurality of duplicate video field image signals is a duplicate of a selected one of said fourth plurality of genuine video field image signals.

16. A field image signal conversion method as recited in claim 15, wherein said step of receiving said first plurality of input signals comprises the step of storing said first plurality of input signals.

17. A field image signal conversion method as recited in claim 15, wherein said step of selectively generating said third plurality of video field image signals comprises the step of performing a 3-2 film-to-video frame pulldown.

18. A field image signal conversion method as recited in claim 17, wherein said step of performing said 3-2 film-to-video frame pulldown comprises the step of selectively multiplexing said second plurality of film field image signals.

19. A field image signal conversion method as recited in claim 15, wherein said step of identifying each of said fifth plurality of duplicate video field image signals comprises the step of inserting one of said corresponding fifth plurality of field identification data signals into each of said fifth plurality of duplicate video field image signals.

20. A field image signal conversion method as recited in claim 19, wherein said step of inserting one of said corresponding fifth plurality of field identification data signals into each of said fifth plurality of duplicate video field image signals comprises the step of inserting said one of said corresponding fifth plurality of field identification data signals into a vertical blanking interval within said each one of said fifth plurality of duplicate video field image signals.

21. A film-to-video frame image signal conversion method for converting a plurality of film frame image signals having an associated film frame image rate to a plurality of video frame image signals having an associated video frame image rate, said frame image signal conversion method comprising the steps of:

receiving a first plurality of input signals representing film frame images and having an associated film frame image rate, and providing therefrom a second plurality of film frame image signals;

receiving said second plurality of film frame image signals and selectively generating therefrom a third plurality of video frame image signals representing video frame images and having an associated video frame image rate which is unequal to said associated film frame image rate, wherein said third plurality of video frame image signals includes a fourth plurality of genuine video frame image signals representing genuine video frame images which correspond to said film frame images, and further wherein said third plurality of video frame image signals further includes a fifth plurality of simulated video frame image signals which represent simulated video frame images and include selected portions of selected ones of said fourth plurality of genuine video frame image signals; and identifying each of said fifth plurality of simulated video frame image signals by inserting into each thereof one of a corresponding fifth plurality of frame identification data signals which indicate that each of said fifth plurality of simulated video frame image signals includes selected portions of selected ones of said fourth plurality of genuine video frame image signals.

22. A frame image signal conversion method as recited in claim 21, wherein said step of receiving said first plurality of input signals comprises the step of storing said first plurality of input signals.

23. A frame image signal conversion method as recited in claim 21, wherein said step of selectively generating said third plurality of video frame image signals comprises the step of performing a 3-2 film-to-video frame pulldown.

24. A frame image signal conversion method as recited in claim 23, wherein said step of performing said 3-2 film-to-video frame pulldown comprises the step of selectively multiplexing said second plurality of film frame image signals.

25. A frame image signal conversion method as recited in claim 21, wherein said step of identifying said fifth plurality of simulated video frame image signals comprises the step of inserting one of said corresponding fifth plurality of frame identification data signals into each of said fifth plurality of simulated video frame image signals.

26. A frame image signal conversion method as recited in claim 25, wherein said step of inserting one of said corresponding fifth plurality of frame identification data signals into each of said fifth plurality of simulated video frame image signals comprises the step of inserting said one of said corresponding fifth plurality of frame identification data signals into a vertical blanking interval within said each one of said fifth plurality of simulated video frame image signals.

* * * * *